April 26, 1955     K. FANNING     2,706,862
ARITHMETICAL INSTRUCTION DEVICE
Filed June 7, 1954
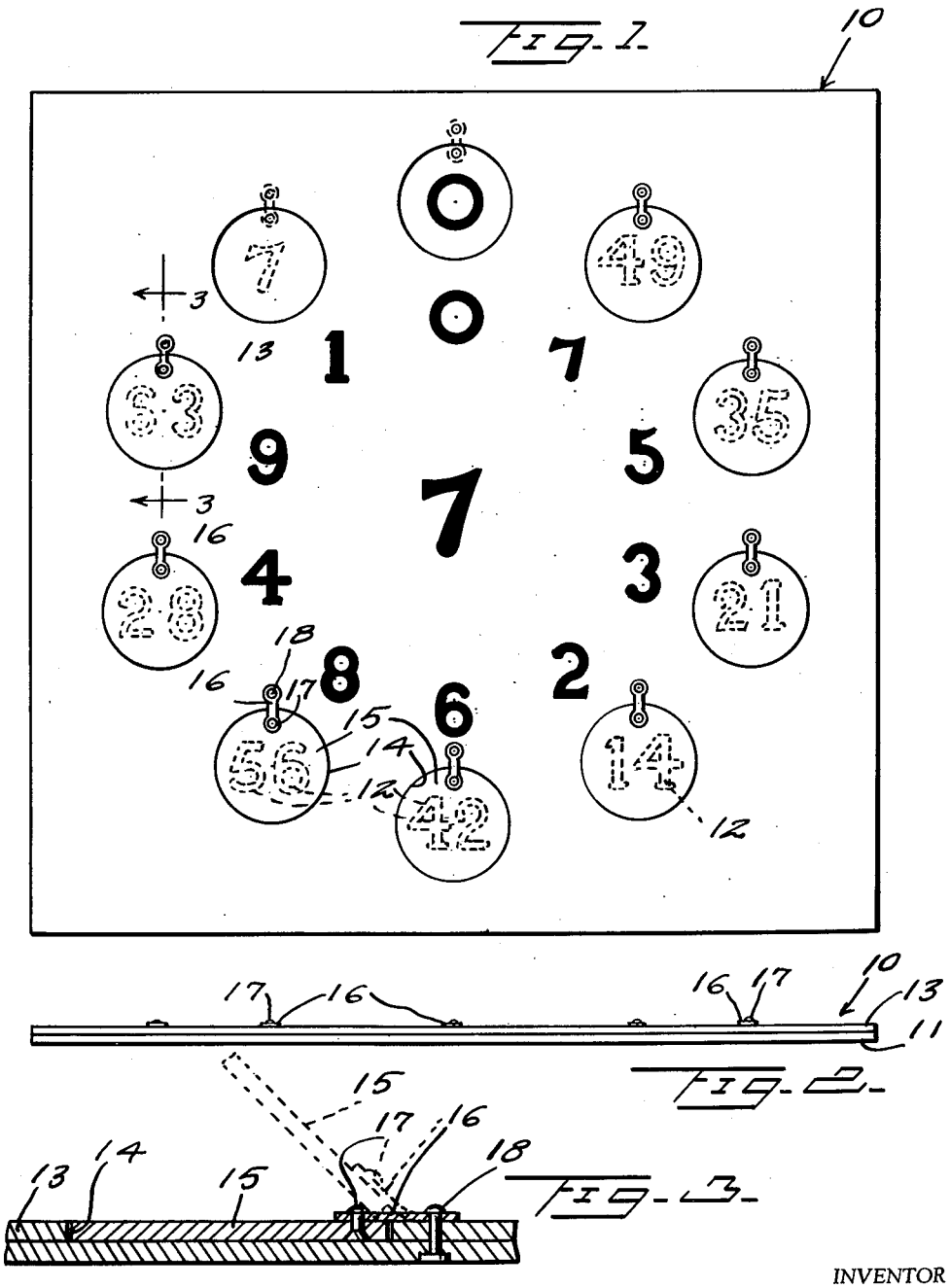
INVENTOR
*Kathleen Fanning*
BY *Kimmel & Crowell*
ATTORNEYS – # United States Patent Office 2,706,862
Patented Apr. 26, 1955

2,706,862

ARITHMETICAL INSTRUCTION DEVICE

Kathleen Fanning, Cornwall-on-Hudson, N. Y.

Application June 7, 1954, Serial No. 434,785

2 Claims. (Cl. 35—9)

This invention relates to instruction devices, and more specifically to apparatus especially designed to resolve mathematical problems.

One of the primary objects of this invention is to provide an instruction device of the type referred to above wherein the factors of the problem are visible at all times while the answer thereto may be, optionally, visible or hidden from view.

Another object of this invention is to provide a plurality of mathematical instruction boards forming a set for teaching the multiplication tables for the numbers one to nine, inclusive.

A further object of this invention is to provide each of the boards of the set with a centrally positioned multiplier from around which are disposed the radially spaced multiplicands, the multipliers comprising any one of the numerals one to nine, inclusive, and the multiplicands comprising, in each case, the numerals zero to nine, inclusive, and with the result to any given multiplication problem being positioned adjacent to the multiplicand and substantially radially aligned with the multiplier and multiplicand.

A still further object of this invention is to provide manually operated means for covering and uncovering the result of the multiplication problem.

A further object of this invention is to provide instruction apparatus of the type described which is inexpensive to manufacture and maintain, non-complex in construction and assembly, and durable in use.

Other and further objects and advantages of this invention will become more apparent from a consideration of the following specification when read in conjunction with the annexed drawing, in which—

Figure 1 is a top plan view of a multiplication instruction device constructed in accordance with the teachings of this invention.

Figure 2 is a side elevation of the device shown in Figure 1.

Figure 3 is a partial cross-sectional view taken on the vertical plane of line 3—3 of Figure 1.

Referring now more specifically to the drawing, reference numeral 10 designates an instruction device constructed according to this invention. The device 10 comprises a substantially rectangular base 11 formed of plywood or other relatively rigid and light weight material. A plurality of numbers 12 are printed or embossed on the upper surface of the base 11 at intervals radially spaced from the center point of the base.

A relatively thin rectangular sheet or top section 13 of non-transparent material is secured to the upper side of the base 11 and is provided with a plurality of circular openings 14 radially spaced from its center point and corresponding in number to the number of numerals imprinted on the base 11. As seen in the drawing, the sheet or top section 13 is arranged on the base 11 in such a manner as to permit the numerals 12 to be visible through the openings 14.

In the device 10, shown in Figure 1, the numeral 7 is imprinted on the sheet or top section 13 substantially at the center thereof and the numerals 0 to 9 are also imprinted thereon at radially spaced intervals and each of the numerals is located intermediate an opening 14 and the numeral 7. The numeral 7, in this case is the multiplier, and the numerals 0 to 9, inclusive, serve as the multiplicands, and the numerals visible through each of the openings 14 represent the result of the multiplication of its adjacent multiplicand with the multiplier.

A circular closure member 15 made of durable material, and when closed, setting in the opening flush with the top section, is provided for each of the openings 14, the number interfitting therein. Each of these members 15 has one end of a strip of flexible material 16, such as leather, or a hinge, secured by a rivet 17, while the other end thereof is fixedly secured to the base 11 and sheet or top section 13 by a rivet 18 which extends therethrough.

In operation, the student first studies and memorizes the result of any given multiplication problem represented by the multiplier and any of the multiplicands. This is done with the closure member 15 in its raised position. After the memorization of the result, the member 15 is moved to its closed position, as shown in Figure 3. Thereafter, the results of subsequent multiplications are learned in the same manner. At a later time, the student may check his memory of any of the multiplications by raising the closure member 15 and comparing his answer with that shown through the opening 14.

It is manifest that this device could also be utilized in determining the answer to divisional problems by placing the divisor in the center, the dividends radially spaced around it and the quotients under each closure member 15 adjacent to the dividend and substantially radially aligned with the divisor and dividend.

The arrangement of the numerals and the construction of the device lends itself equally well in the instruction of simple addition and subtraction problems. This is, from the foregoing description, so obvious that no further explanation need be made.

While but one of the instruction devices has been disclosed herein it will be understood that this invention contemplates the provision of a plurality thereof, identically constructed, with the exception that each will bear in the case of multiplication a different multiplier selected from the numerals 1 to 9, inclusive, and the correct answers in each case. Also it is intended that others be constructed in like manner with the exception that each will bear the numbers necessary to make it suitable for use in addition, subtraction, and division.

Having described and illustrated one embodiment of this invention in detail, it will be understood that the same is offered by way of example, and that the invention is only to be limited by the scope of the appended claims.

What is claimed is:

1. An instruction device for solving mathematical problems comprising a substantially rectangular base having a plurality of numerals imprinted on a side thereof at intervals radially spaced from substantially the center point of said base, a rectangular cover sheet or top section secured to and extending across said side of said base, said cover sheet or top section formed of opaque material and having a plurality of openings formed therein for registry with said numerals on said base, a numeral imprinted on said sheet or top section adjacent each of said openings and a numeral imprinted on said sheet or top section substantially at the center point thereof, each of said numerals on said base visible through its respective opening, the numeral adjacent said last opening and the numeral at the center point of the sheet or top section being substantially in alignment, said numeral appearing through any of said openings comprising the result of a mathematical function of the two numerals aligned therewith, an opaque circular manually operated closure member disposed in each of said openings for movement toward and away from said base and when closed setting down in the opening flush with the top sheet or section, and flexible means connecting said closure members with said base.

2. An instruction device for solving mathematical problems comprising a base having a plurality of numerals imprinted on a side thereof at intervals radially spaced from substantially the center point of said base, a cover sheet secured to and extending across said side of said base, said cover sheet formed of opaque material and having a plurality of openings formed therein for registry with said numerals on said base, a numeral imprinted on said sheet adjacent each of said openings and a numeral imprinted on said sheet substantially at the center point thereof, each of said numerals on said base being visible through its respective opening, the numeral adjacent said last opening and the numeral at the center point of the sheet being substantially in alignment, said numeral appearing through any of said openings comprising the result of a mathematical function of the two numerals aligned therewith, an opaque manually operated closure member disposed in each of said openings for movement toward and away from said base and which when closed is flush with the top surface of the top sheet, and flexible means connecting said closure members with said base.

References Cited in the file of this patent

UNITED STATES PATENTS

| Number | Name | Date |
|---|---|---|
| 629,891 | Cunningham | Aug. 1, 1899 |
| 1,490,858 | Seegers | Apr. 15, 1924 |
| 1,696,988 | Troidl | Jan. 1, 1929 |
| 1,946,318 | Hamilton | Feb. 6, 1934 |
| 2,544,961 | Kemp | Mar. 13, 1951 |